United States Patent [19]

Anderson et al.

[11] 3,888,953

[45] June 10, 1975

[54] PREPARATION OF TRIS (2-CHLOROETHYL) PHOSPHITE

[75] Inventors: James J. Anderson, Richmond, Va.; Vasco G. Camacho, Iselin, N.J.

[73] Assignee: Mobil Oil Corporation, New York, N.Y.

[22] Filed: Dec. 7, 1973

[21] Appl. No.: 423,049

[52] U.S. Cl. ............................ 260/977; 260/967
[51] Int. Cl. .................................... C07f 9/08
[58] Field of Search ................................ 260/977

[56] References Cited
UNITED STATES PATENTS 1,936,985  11/1933  Lommel et al.................. 260/977 X
3,428,715  2/1969  West et al...................... 260/977 X
3,577,483  5/1971  Kotzschmar et al............... 260/977

*Primary Examiner*—Anton H. Sutto
*Attorney, Agent, or Firm*—Charles A. Huggett; Hastings S. Trigg

[57] ABSTRACT

The preparation of tris (2-chloroethyl) phosphite (TCEP) is carried out utilizing simultaneous additions of phosphorus trichloride and ethylene oxide to a heel of preformed TCEP. TCEP is useful as a high-pressure lubricant additive, an antioxidant, a flameproofing agent, or an org. synthesis intermediate.

2 Claims, No Drawings

PREPARATION OF TRIS (2-CHLOROETHYL) PHOSPHITE

BACKGROUND OF THE INVENTION

1. Field of the Invention

This invention is concerned with a novel process for the preparation of tris (2-chloroethyl) phosphite.

2. Description of the Prior Art

The conventional procedure for the preparation of tris (2-chloroethyl) phosphite is by the gradual addition of ethylene oxide to $PCl_3$ (British No. 1,048,070). In this process, to $PCl_3$ and chloroethanol catalyst is added ethylene oxide at a rate which, with some cooling, will maintain reaction at −10°C. to +20°C.

Although this procedure is satisfactory for small laboratory-scale preparations, it is highly hazardous on a large commercial scale because of the danger of violent reaction in event of any leakage from the required water cooling coils. The situation is further aggravated by the corrosive nature of concentrated phosphorus trichloride. The inverse addition, i.e., addition of $PCl_3$ to ethylene oxide, brings forth the equally hazardous situation of carrying out the reaction with high ethylene oxide levels which present an explosion hazard.

It is the discovery of this invention that the simultaneous addition of both reagents to a heel of product can be carried out safely and without loss in product purity and yield.

SUMMARY OF THE INVENTION

This invention provides a process for the preparation of tris (2-chloroethyl) phosphite which comprises adding ethylene oxide and phosphorus trichloride in a molar ratio of 3.2:1 to about 3.9:1 to a heel of tris (2-chloroethyl) phosphite at a temperature between about −10°C. and about +20°C.

DESCRIPTION OF SPECIFIC EMBODIMENTS

The phosphorus trichloride and ethylene oxide reactants are well-known compounds. They are readily available commercially.

The "heel" of preformed tris (2-chloroethyl) phosphite generally serves as a diluent and heat transfer means in the reaction. It can be initially preformed by using prior art methods of preparing tris (2-chloroethyl) phosphite, such as for example as described in British No. 1,048,070. Of course, once an initial heel is obtained further preformed product can be obtained in the process of this invention. Generally, the amount of heel used will be between about 10% and about 100% based upon vessel size.

As has been set forth hereinbefore, the ethylene oxide and phosphorus trichloride reactants are introduced into the reaction simultaneously, usually in separate measured streams. The reaction can be carried out using a molar excess of ethylene oxide over the stoichiometric amounts of reactant of a molar ratio of 3, i.e., 3 moles of ethylene oxide to 1 mole of phosphorus trichloride. Accordingly, the molar ratio of ethylene oxide to phosphorus trichloride charged simultaneously to the reaction will be between about 3.2:1 and about 3.9:1, preferably about 3.3:1.

The reaction temperature is maintained at between about −10°C and about +20°C., preferably between about 0°C. and about 10°C. by the use of suitable cooling and adjusting of the addition rates. Generally, the addition rates are adjusted to permit maintenance of the desired reaction temperature with the available cooling. If the process is carried out with continuous product removal the residence time is preferably between about 0.5 and about 10 hours. The tris (2-chloroethyl) phosphite thus produced is readily isolated by simply vacuum stripping the reaction product to remove excess ethylene oxide and other volatile material.

In the following examples, the process of this invention is demonstrated in a batch reaction, a semi- continuous reaction, and a continuous reaction. Using the molar excess of ethylene oxide relative to the stoichiometric amount, ethylene oxide and phosphorus trichloride are reacted in a temperature range of about 0°–10°C. to form tris (2-chloroethyl) phosphite (TCEP) in accordance with the following equation:

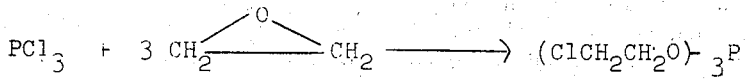

$$PCl_3 + 3\ CH_2\overset{O}{-\!\!\!-\!\!\!-}CH_2 \longrightarrow (ClCH_2CH_2O)_3P$$

EXAMPLE 1

TCEP was prepared on a 0.8 mole scale by simultaneous addition of 2.52 moles ethylene oxide and 0.8 moles phosphorus trichloride to 0.2 moles TCEP heel. The addition was carried out at 0°C. to 5°C. over 2.5 hours, using a cooling bath of dry ice and acetone. The TCEP product was isolated by vacuum stripping up to about 70°C. under a reduced pressure of about 5 mm. of Hg. The product analysis is set forth in Table I.

Under similar conditions TCEP was prepared except that the ethylene oxide was added to the phosphorus trichloride. Analysis of the product obtained is set forth in Table I.

Similarly, TCEP was prepared by adding $PCl_3$ to ethylene oxide. The analysis of the product obtained is set forth in Table I.

TABLE I

| Method | % TCEP by $I_2$a | % TCEP by $I_2$b | TAN mgKOH/g[c] | Yield Wt. %[d] |
|---|---|---|---|---|
| Simultaneous | 96 | <0.3 | 0.7 | 99 |
| EO to $PCl_3$ | 97 | <0.3 | 0.3 | 99 |
| $PCl_3$ to EO | 97 | <0.3 | 0.4 | 100 |

[a]$I_2$ titrations
[b]Bis (2-chloroethyl) phosphonate by $I_2$ titration
[c]Total acid number
[d]Weight percent yield of vacuum stripped product based on $PCl_3$

EXAMPLE 2

A 2000 gallon stainless steel autoclave, equipped with a jacket through which was circulated a glycol/water mixture refrigerated to about −17°C. was charged with 500 gallons TCEP prepared by the addition of phosphorus trichloride to ethylene oxide in the same reactor. The reaction was filled by simultaneous addition of ethylene oxide and PCl₃ in about 3.3:1 mole ratio at a rate to maintain the temperature at 0° to 8°C. A 650 gallon portion was removed and the simultaneous addition was continued to refill the reactor. This 650 gallon cycle was repeated. The analyses on vacuum stripped product from the reactor are set forth in Table II.

TABLE II

| Sample | % TCEP by $I_2$ |
|---|---|
| 500 gallon heel (PCl₃ to EO product) | 94 |
| Full reactor (2000 gallons) | 95 |
| After first 650 gal. cycle | 95 |
| After second 650 gal. cycle | 95 |

EXAMPLE 3

A fully continuous preparation of TCEP was carried out in a 300 gallon glass-lined reactor provided with agitation, a 100 gallon capacity pump around loop and internal heat exchangers and jacket through which was circulated a glycol/water mixture refrigerated to about −17°C. The reactor was filled with TCEP containing approximately 5 weight percent ethylene oxide. The purity of this TCEP, neglecting the excess ethylene oxide, was approximately 90% by $I_2$. The ethylene oxide and PCl₃ were added simultaneously at approximately 2.5 pounds/minute each. The ethylene oxide: PCl₃ mole ratio was approximately 3.3:1, and was adjusted to maintain 3 to 9 weight percent ethylene oxide in the reactor. The temperature was maintained between 0°C. and 5°C. by the available cooling. The product was removed by continuous overflow. Analyses of the stripped product are set forth in Table III with the total pounds of product produced to that point. The analyses of the product at intermediate points ranged from 93 to 96%.

TABLE III

| Total Pounds Product Produced | % TCEP by $I_2$ |
|---|---|
| 0 | 90 |
| 11,000 | 94 |
| 36,000 | 94 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for the preparation of tris (2-chloroethyl) phosphite, which comprises simultaneously adding ethylene oxide and phosphorus trichloride, in a molar ratio of between about 3.2:1 and about 3.9:1, to performed tris (2-chloroethyl) phosphite in an amount between about 10% and about 100% of the reactants at a temperature between 0°C. and about 10°C.

2. The process of claim 1, wherein the process is carried out by continuously adding said ethylene oxide and phosphorus trichloride and withdrawing product at about the same rate.

* * * * *